United States Patent [19]
Gilden et al.

[11] Patent Number: 4,609,356
[45] Date of Patent: Sep. 2, 1986

[54] REARRANGEABLE FORM BOARD WITH SENSORY FEEDBACK

[76] Inventors: Deborah B. Gilden, 225 Vista Del Mar, San Rafael, Calif. 94901; John E. Marciszewski, 1102 Knollwood Dr., Middletown, N.J. 07748

[21] Appl. No.: 714,251

[22] Filed: Mar. 20, 1985

[51] Int. Cl.⁴ ............................................. G09B 19/00
[52] U.S. Cl. ....................................... 434/259; 434/330
[58] Field of Search ............ 273/1 GD, 156; 434/168, 434/169, 190, 258, 259, 330, 333, 429, 304

[56] References Cited

U.S. PATENT DOCUMENTS

| | | |
|---|---|---|
| 2,416,959 | 3/1947 | Segal . |
| 2,673,404 | 3/1954 | Abrahamson .................. 434/330 |
| 3,008,246 | 11/1961 | Stall . |
| 3,015,895 | 1/1962 | Stall ............................... 434/330 X |
| 3,362,103 | 1/1968 | Neumann ...................... 273/156 X |
| 3,568,336 | 3/1971 | Noble . |
| 3,961,794 | 6/1976 | Goldfarb et al. . |
| 4,176,470 | 11/1979 | Fosner et al. . |
| 4,237,650 | 12/1980 | Goldfarb . |
| 4,348,191 | 9/1982 | Lipsitz et al. ..................... 434/308 |
| 4,349,197 | 9/1982 | Livick .............................. 273/1 GF |
| 4,385,762 | 5/1983 | Schwartz ........................ 273/1 GC |

OTHER PUBLICATIONS

Lakeshore Curriculum Materials Co. Catalog, ©1983, pp. 94 & 95.

Primary Examiner—Harland S. Skogquist
Attorney, Agent, or Firm—David Pressman

[57] ABSTRACT

An educational toy comprises a tray (12, 14) having a plurality of templates (16) positioned thereon in a rearrangeable pattern. Each template has a hole therethrough of a unique shape. A corresponding plurality of mating male forms (20) are provided. The toy is used by placing the forms into their mating templates. Upon placement of a form into its mating template, a magnet (30) in the base of the form becomes positioned close enough to close a reed switch (32) under the tray. Closure of the reed switch activates a timing circuit (FIG. 7) which activates a moving, sounding toy (22) for a brief interval, thereby indicating to the child that he or she has made a correct placement. The templates can be easily rearranged in many patterns on the tray so that the child will not get bored with the game.

20 Claims, 7 Drawing Figures

OVERALL VIEW FORM-BOARD, REARRANGABLE TEMPLATES, FORMS, AND MOVING TOY

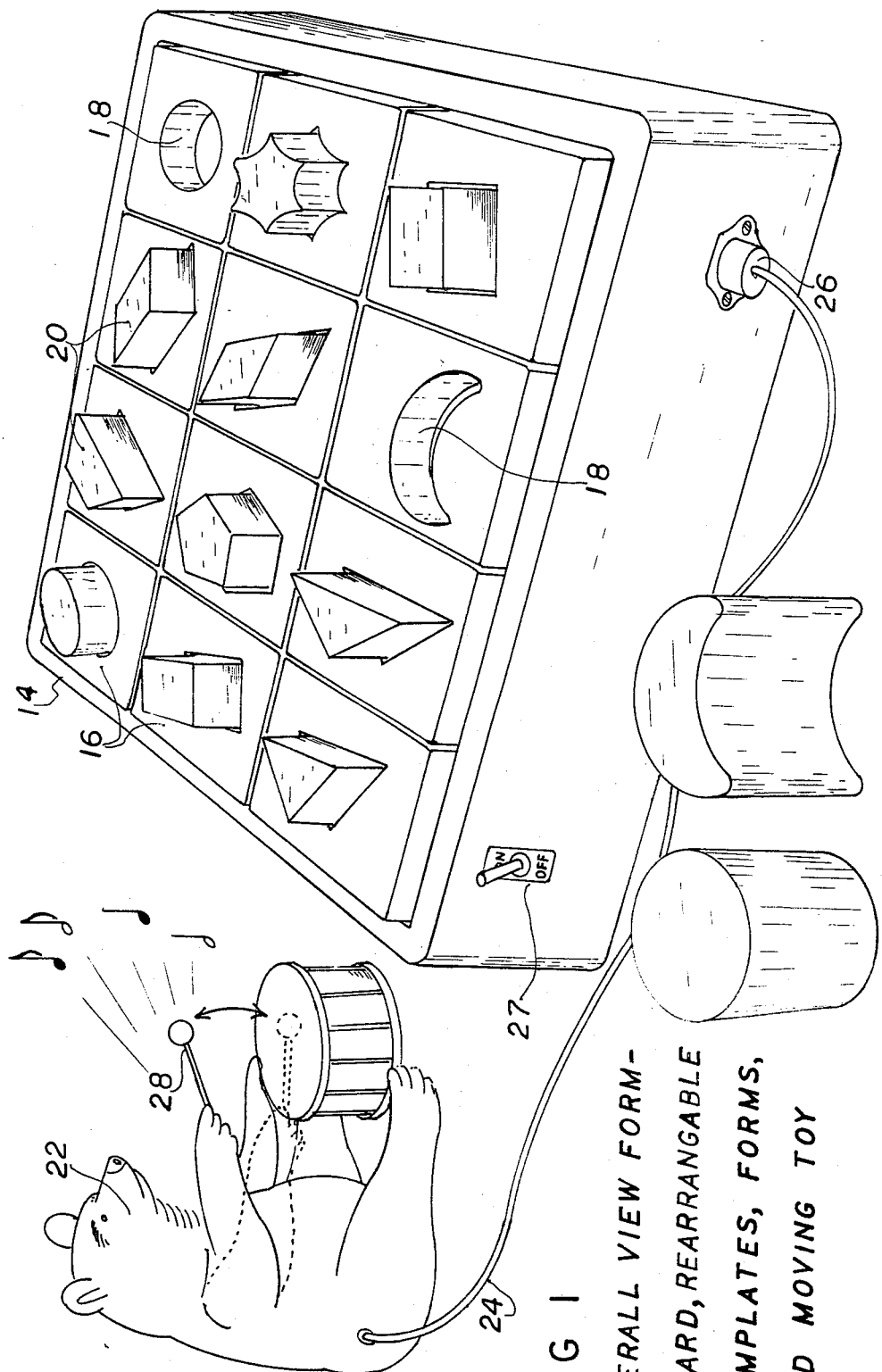
FIG 1 OVERALL VIEW FORM-BOARD, REARRANGABLE TEMPLATES, FORMS, AND MOVING TOY

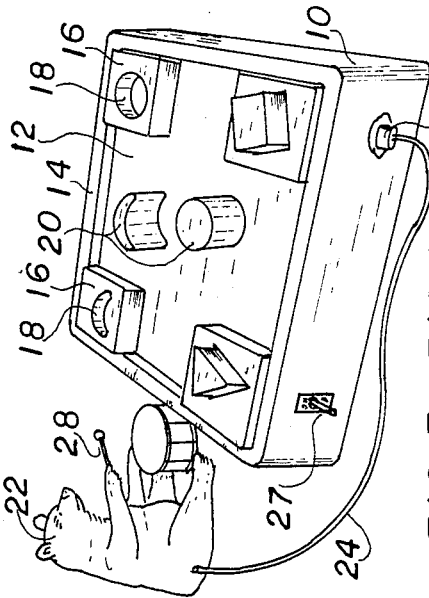
FIG 3—FIG 1
VIEW WITH FOUR TEMPLATES AND FORMS
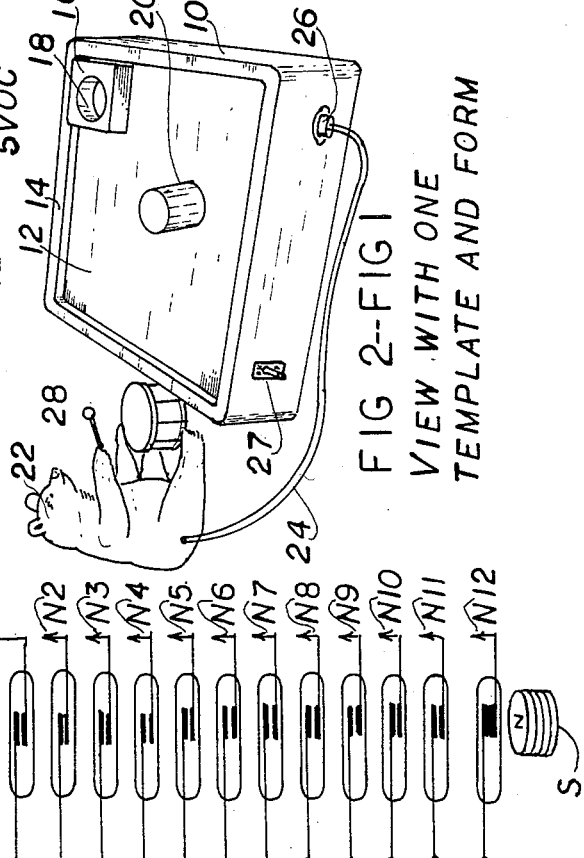
FIG 2—FIG 1
VIEW WITH ONE TEMPLATE AND FORM
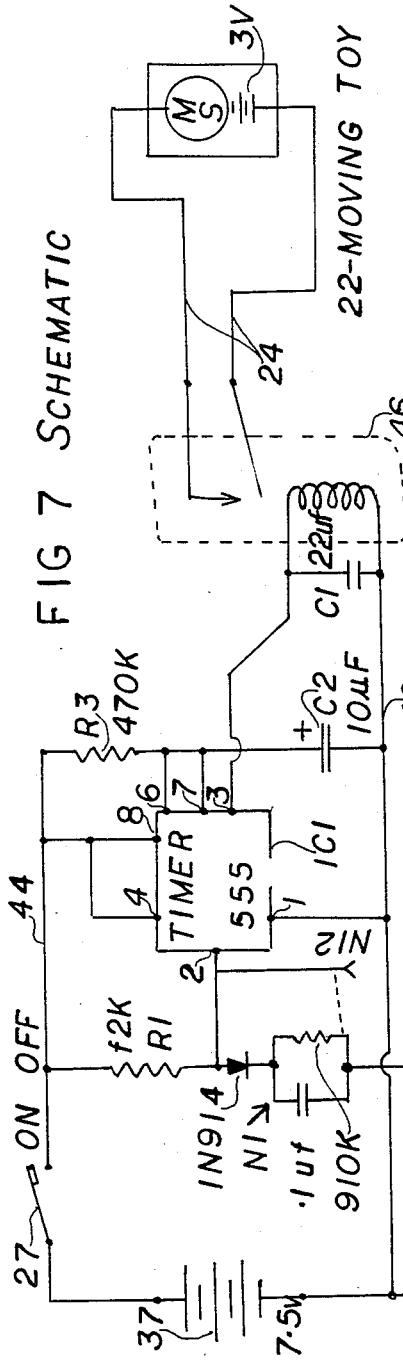
FIG 7 SCHEMATIC

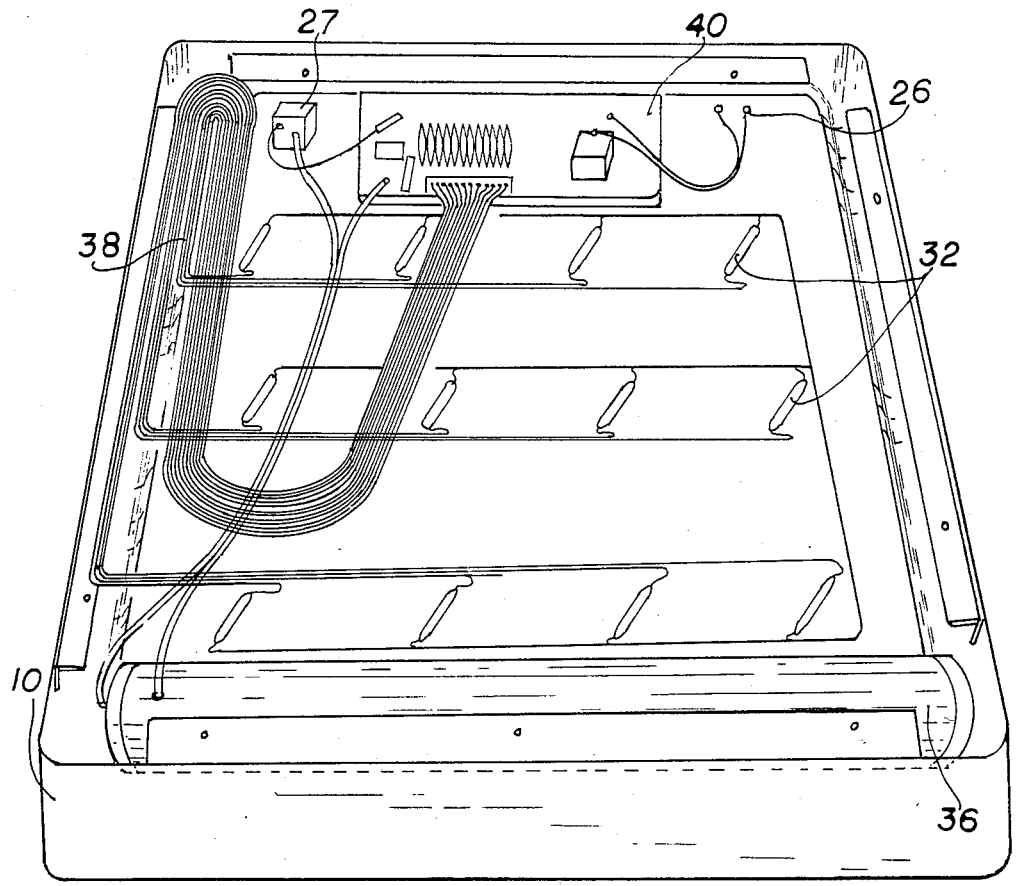
FIG 5 UNDERSIDE OF GAME SHOWING WIRING AND REED SWITCH
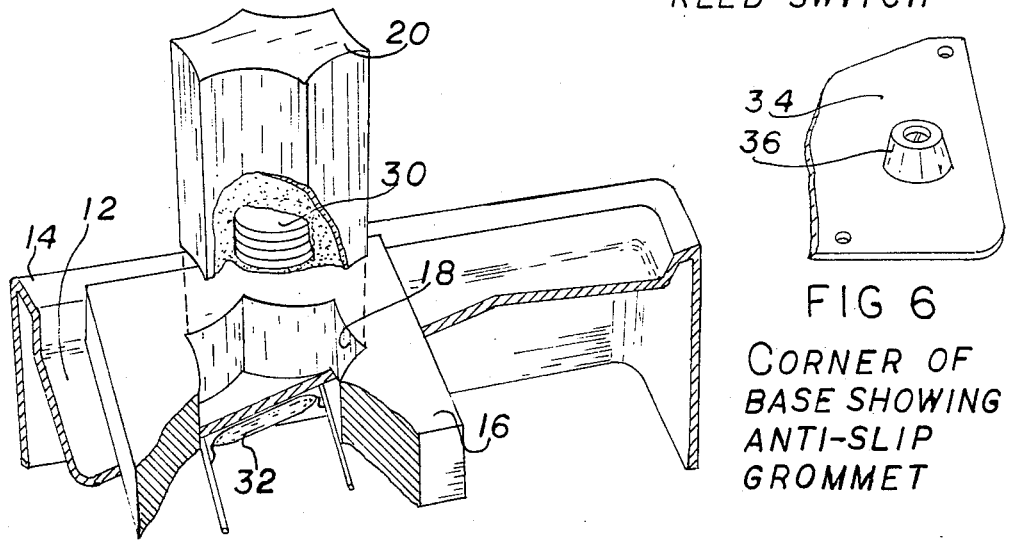
FIG 6 CORNER OF BASE SHOWING ANTI-SLIP GROMMET
FIG 4 PARTIAL FRAGMENTED VIEW OF TEMPLATE SHOWING MAGNET AND REED

REARRANGEABLE FORM BOARD WITH SENSORY FEEDBACK

BACKGROUND

1. Field Of Invention

This invention relates to the field of educational toys, particularly to one such toy which employs the matching of geometric shapes and which is suitable for very young children, and children with visual, and/or auditory, and/or developmental disabilities.

2. Description Of The Prior Art

Most children have used or are familiar with a "form board", i.e., a toy comprising a board with a plurality of different geometric holes or recesses, such as circular, square, and triangular, which is used by inserting corresponding mating male forms with matching geometric shapes into the respective recesses. The object of the toy is to teach children spatial or shape awareness by having them insert the male forms into the correct respective recesses.

While the form board has been used for many years in various arrangements, it suffered from a number of drawbacks. First, many children have very low interest in puzzles or challenges which involve the use of spatial abilities. Second, even if the child is interested, he or she will soon tire of the form board because it is soon learned and mastered and since it does not provide any useful reward other than the minimal satisfaction of inserting a form into a recess. Third, such form boards were not especially useable by visually and/or auditorily handicapped children since they could not have any visual or auditory verification that a proper match had been made.

Various commercial adaptations of the form board have been produced. In one, sometimes termed Montessori shapes and templates, a plurality of loose female templates were provided with a plurality of corresponding mating male forms. While this arrangement, and several minor variations of it, was used by children, it suffered from most of the aforementioned disadvantages common to most form boards.

Electrical versions of form boards have also been provided. In these, the child was given a plurality of forms or shapes and a form board with matching female recesses. Correct insertion of the male forms closed a switch, which in turn provided an auditory or visual feedback response. While an improvement on the basic form board, these electrical versions suffered from lack of versatility and flexibility. Thus they were soon mastered by most children, whereupon their use diminished greatly since they presented no further challenge to the children. Also, some were very complex in construction and operation, thus providing problems of high cost, complexity, reliability, and difficulty of use.

OBJECTS AND ADVANTAGES

Accordingly several objects and advantages of the invention are to provide a new educational toy, to provide an educational toy which provides interest to children who do not normally like puzzles or spatial challenges, to provide an educational toy which can be rearranged so that even after initial mastery, it still can be made to have continuing utility, to provide an educational toy which provides an enjoyable reward to children upon successful operations of the toy, to provide such a toy which is simple, reliable, inexpensive, and easy to use, and to provide an educational toy which is very useful for visually and/or auditorily hadndicapped children. Further objects and advantages of the invention will become apparent from a consideration of the accompanying drawings and ensuing description.

DRAWINGS

FIG. 1 is a perspective view of a form board educational toy according to the invention.

FIG. 2 is a view of such game in a very simplified form and FIG. 3 is a view of the game in a partially simplified form.

FIG. 4 is a view of the underside of the game with its bottom removed to show its components.

FIG. 5 is a partial broken-away view of a template, form, and part of the board of the game.

FIG. 6 is a partial view of a bottom underside corner of the game.

FIG. 7 is a schematic diagram of the circuitry used in the game.

REFERENCE NUMERALS 10 box
12 recess
14 rim
16 template
18 hole in 16
20 form block
22 animated toy (bear)
24 electrical cord
26 connector
27 on/off switch
28 flag
30 magnet
32 reed switches
34 bottom plate
36 rubber foot
37 battery or cell
38 wiring
40 circuit board
42 ground
44 positive voltage line
46 relay

FIGS. 1 to 3—OVERALL DESCRIPTION OF TOY

Overall: An educational toy according to the invention is shown in perspective view in FIGS. 1 to 3. It comprises a box or housing 10, a plurality of template (female) blocks 16, a corresponding plurality of mating male forms 20, and a toy figure 22 which is connected to box 10 by an electrical cord 24.

Box 10: Box 10 has a rectangular shape when seen from the top. The sides of box 10 are about 33 cm by 26 cm and its height is about 7 cm. Box 10 may be made of metal, wood, or plastic. An on/off switch 27 is mounted on box 10.

The top surface of the box has a recess 12 (FIGS. 2 and 3) about 13 mm deep as defined by an outer rim or ridge 14. Recess 12 is slightly smaller in its plan view than box 10; thus it occupies most of the area of the box. Ridge 14 thus combines with recess 12 to form a tray on and integral with the top of the box, but the tray (recess 12 and ridge 14) may be provided separately from box 10.

Templates 16: Positioned in recess 12 are twelve female blocks or templates, such as 16, each of which is about 76 mm square and about 38 mm thick. Templates 16 are shown in FIG. 1 arranged in four rows of three each. The twelve templates, when all positioned in recess 12, occupy substantially all of the area of the recess or tray but have enough clearance with the sides of the tray so that any template can be removed easily. In accordance with the invention, any number of templates, from one (FIG. 2), to four (FIG. 3), to all twelve (FIG. 1), can be located in recess 12. Templates 16 are made of wood or plastic. Each template has a through hole, such as 18, of a unique shape. The through holes, as indicated, have the following shapes: circular, square, rectangular, triangular, diamondlike, pentagonal, oval, trapezoidal, curved sector, star, etc. Each hole has approximately the same area, which is about ⅛ to ½ the area of the template.

Form Blocks 20: Corresponding to respective holes 18 in blocks 16 are twelve form blocks, such as 20; blocks 20 have the same shapes, in their plan views, as respective holes 18. Each block is about 76 mm in height; thus when a block is inserted in its respective hole, it will protrude up about 76 mm. Blocks 16 and holes 18 are shaped such that each block can be inserted into only one hole, i.e., its mating hole.

Toy 22: An animated toy animal, shown as a loveable bear 22, is connected electrically to box 10 by a two-wire electrical cord 24 and a two-contact connector 26 which is mounted on box 10. Bear 22 contains its own battery, motor, and sound reproducer, such that when switched on, as will be described below, bear 22 will emit sounds, e.g., a musical tune, and will simultaneously move its arm so as to wave a flag 28, as indicated thereat.

FIGS. 1 TO 3—USE OF TOY

The toy of FIGS. 1 to 3 is used in the following manner.

FIG. 2: To start the child and familiarize him or her wih the toy's operation, the toy is arranged in its simplest format with one template 16 located in a corner of recess 12, as indicated in FIG. 2. The child is then shown how to insert a matching form 20 into the hole in the single template. Upon insertion, bear 22 will be electrically activated (operation described infra) so as to move and emit sounds for a brief period, about 10 seconds, to indicate to the child that he or she has inserted the form into the template correctly. Since bear 22 both moves and emits sounds, its activation will be perceptible to both visually and auditorily handicapped children. If a child is both deaf and blind, he or she can perceive activation of bear 22 by feel.

Once the child has mastered operation of the arrangement of FIG. 2, the toy can be rearranged so as to make it increasingly difficult to use.

First, the single template 16 in recess 12 can be moved to different locations in recess 12. As will be described infra, it is necessary, for the toy to operate correctly, that template 16 be located in one of the twelve discrete locations in recess 12, as shown in FIG. 1. This can be easily accomplished by locating the template in one of the four corner locations (shown in FIG. 3), or by providing a twelve-part gridwork of small guide ridges or subrecesses (not shown) on the floor of recess 12 to guide placement of the single template. When the single template is in one of the twelve possible locations of FIG. 1 and its form is inserted, bear 22 will be activated for about 10 seconds, as before.

Once the child has learned to insert the form block into the single template at any of the twelve locations, the template (except for those which are radially symmetric—such as the circle) may be rotated to up to three new orientations (90 degrees, 180 degrees, 270 degrees). This will demonstrate the generalizability of certain geometric spatial relations to the child.

Next, when the child masters various locations and orientations of the single template, the toy can be made more difficult by using a single template, but by giving the child a choice of several forms 16 instead of a single correct one. The child will then have to choose the correct form so that it can be inserted into the single template, whereupon the bear will be activated.

FIG. 3: The next level of difficulty will be the use of two templates and one form. Once mastered, either or both template(s) may be rotated to present a varitation of the task. Then two templates and two forms can be used, and so on. FIG. 3 illustrates use of four templates and four forms. The level of difficulty can be increased beyond FIG. 3 by rotating some of the template blocks, by using more than four forms, then four forms and more than four templates, etc.

FIG. 1: The child is worked gradually up to the level of FIG. 1 where twelve templates and twelve forms are used.

When the child masters the level of difficulty of the arrangement of FIG. 1, the difficulty level can still be increased even further, in accordance with the invention, by rearranging the templates in the tray. Hundreds of different arrangements are possible since each template can be placed in any of twelve possible locations, and for each location most template blocks can be rotated to up to four different orientations as aforedescribed. Thus the presence of twelve templates provides a virtually-inexhaustable variety of challenges.

FIGS. 4 AND 5—OPERATION OF MAGNETIC SWITCHES

Refer to FIG. 4, which is a partial, cross-sectional view of part of the top of box 10 showing a cross-section of one form 20 and one template 16. The toy operates through the use of magnets, such as 30, in the base of each form 20, which operate mating magnetically-sensitive (reed) switches, such as 32, underneath the floor of recess 12. When form 20 is inserted into hole 18 in template 16, its magnet 30 will come close enough to reed switch 32, which is under the floor of recess 12 and under the center of template 16, to actuate the reed switch. I.e., magnet 30 will cause the contacts of reed switch 32 to close when form 20 is inserted into its template 16. Upon closure of the contacts of switch 32, an electrical circuit (FIG. 7) will in turn be actuated, causing toy 22 (FIG. 1) to operate for a brief interval.

As shown in FIG. 5, which is a view of the underside of box 10 with its bottom plate (FIG. 6) removed, there are twelve magnetically-sensitive reed switches, such as 32, positioned at evenly-spaced locations under the floor of recess 12. Each reed switch is positioned under the center of one of the twelve template locations shown in FIG. 1. Thus when a template is in the proper location, and its form is inserted completely into such template far enough to reach the floor of recess 12, magnet 30 in the bottom of the form will actuate switch 32.

Each form 20 is made with a magnet 30 in its base, the magnet being positioned as close to the bottom of the form as possible. This is done by fabricating form 20 with a recess (not shown) in its bottom, the recess being slightly larger than the magnet. Then magnet 30 is inserted in the recess and the remainder of the recess is filled with a potting compound, such as epoxy. Magnet 30 preferably comprises a stack of five sintered powdered iron magnets, each about 6.4 mm high and 12 mm in diameter, so that the stack is about 12 mm in diameter and about 32 mm high. The magnets in the stack have been magnetically charged so that one pole (either N [North] or S [South]) is at the top and the other pole is at the bottom, the polarization being immaterial—the North pole being shown at the top in FIG. 4 for examplary purposes.

Each reed switch 32 is positioned under the floor of recess 12, in contact with the underside of such floor so as to be as close as possible to its mating magnet 30 when the form is fully inserted. The reed switches may be mounted with non-magnetic clamps or epoxy. They are all connected in electrical parallel, as indicated in FIGS. 5 and 7.

As also shown in FIG. 5, box 10 also contains a battery of cells 37, which in the preferred example comprise five "D" cells, to provide a 7.5-volt supply. Box 10 also contains wiring 38, a circuit board 40, the rear side of connector 26, and the rear side of on/off switch 27.

FIG. 6—BOTTOM OF BOX

The bottom of box 10 is covered by a bottom plate 34, as shown in FIG. 6. Plate 34 may be made of metal or plastic and has four rubber non-skid feet 36 mounted thereon to keep the unit steady in use.

FIG. 7—TIMING CIRCUIT DESCRIPTION

The timing circuit which operates toy 22 for a brief interval upon insertion of a form into a matching template is mounted on board 40 of FIG. 5 and is shown in detail in FIG. 7. Note that component values are indicated in FIG. 7.

The negative side of battery of cells 37 is connected in parallel to the lefthand terminals of the twelve reed switches 32 and to a ground line 42. The positive side of battery 37 is connected to one side of on/off switch 27, the other side of which is connected to a positive supply line 44.

Positive supply line 44 is connected to the upper side of a first resistor R1, the lower side of which is connected to terminal 2 of an integrated circuit timer IC1.

The right side of each reed switch 32 is connected to terminal 2 of IC1 via a respective isolation network. For simplification, only one network, N1, is shown; it comprises a parallel R-C circuit and a series diode. The other eleven networks are indicated by arrows N2 to N12 and a broken line between N1 and connector N12.

The other terminals of IC1 are connected as follows: Terminals 4 and 8 are connected to line 44. Terminal 1 is connected to ground line 42. Terminals 6 and 7 are connected to the lower side of a second resistor R2 and to the upper side of an electrolytic timing capacitor C1. The upper side of R2 is connected to line 44 and the lower side of C1 is connected to ground. Terminal 3 of IC1 is connected to the coil of a relay 46.

The other side of the coil of relay 46 is connected to ground line 42. The coil is paralled by a transient-supressing capacitor C2. The switch terminals of relay 46 are normally open but close when the relay's coil is energized. These terminals are connected to line 24 which is connected (via connector 26—not shown in FIG. 7) to toy 22.

Toy 22 is represented by a box containing a motor (M) and sound generator (S) and a series-connected battery with two output leads 24. Such toys are widely available in many different forms such as dogs, bears, etc. They contain a battery and switch (not shown) which connects the battery to a motor whch moves one part of the creature and a sound generator, which emits sounds. To use such a toy with the invention, leads 24 are connected across its switch (not shown) such that shorting of leads 24 will turn on the toy, just as if such switch were closed. A motor-shunting diode D2 shunts leads 24.

FIG. 7—OPERATION

In its ready state, with switch 27 turned on and the circuit energized, terminal 2 of IC1 will be at a potential of 7.5 V due to its connection to line 44 via R1. This will cause IC1 to be "off" so that it will provide a ground voltage on its output terminal 3. As a result no current will flow through the coil of relay 46. The switch terminals of relay 46 will thus be open, causing leads 24 to be open also. As a result toy 22 will be off.

Now assume that any one of reed switches 32 is closed by bringing a magnet 30 in proximity thereto, i.e., by insertion of a form block 20 into the hole in its correct mating template 16. As a result, the potential of terminal 2 of IC1 will be lowered, causing IC1 to be actuated.

This will cause IC1 to provide a positive output voltage to its terminal 3. This will cause current to flow through the relay's coil, causing the relay's switch terminals to close. leads 24 will thus be shorted together, thus turning on toy 22 and providing a "reward" or positive feedback to the child who inserted the correct form in the template.

At the same time IC1 will allow C1 to begin to charge. When it charges sufficiently, it will turn IC1 off in well-known fashion, whereupon IC1 deenergizes the relay's coil. As a result, the contacts within relay 46 will open, causing toy 22 to turn off. As is well known, toy 22 can be made to operate for longer or shorter periods by adjusting the size of C1 or R2.

BREADTH OF INVENTION AND RAMIFICATIONS

While the above description contains many specificities, these should not be construed as limitations on the scope of the invention, but merely as an example of the presently-preferred embodiment thereof. Many variations of the invention are possible.

For example the number of templates can be varied, their external shapes can be varied (e.g., triangular, hexagonal, etc., rather than square), their through-hole shapes can be varied, their sizes and materials can be varied, the type of feedback can be changed from a moving, sounding toy to lights, moving parts, and other sounds, or a combination thereof, the circuit can be changed to other types of timing circuits, such as a monostable multivibrator, plunger switches can be used in lieu of magnetic switches, the templates can be temporarily attached to the box, the templates can be mounted in the tray in a captivating manner with one template removed, as in the familiar rearrangeable number tile game, the tray switches can be operated by interrupting or reflecting back a light beam, a different, more powerful indication (such as intense lights, sounds, and/or movements) can be provided when all forms have been inserted into all of the respective templates, a hierarchical reward system can be provided for indicating correct insertion of successive form blocks, the timing circuit can be eliminated and a manual reset switch can be provided, a mechanical timer can be provided, the toy or other indicating device can be made to provide other sensible indications, such as palpable, smellable, tasteable, the device can be mounted outside the box, etc.

Accordingly the full scope of the invention should be determined, not by the examples given, but by the appended claims and their legal equivalents.

We claim:

1. An educational toy comprising a tray, a plurality of templates which can be positioned on said tray in a variety of different positions, each template having a hole therethrough which has a unique plan shape, a corresponding plurality of male form blocks, each having a shape which matches the hole in a respective template, and indicating means for providing a sensible indication when a template is positioned on said tray and a mating form block is inserted into said template.

2. The educational toy of claim 1 wherein the number of said templates is sufficient to occupy substantially all of the available area on said tray.

3. The educational toy of claim 1 wherein said indicating means comprises a corresponding plurality of magnetic switches mounted under said tray and a plurality of magnets mounted in said form blocks.

4. The educational toy of claim 3 wherein said indicating means also comprises an electrical timing circuit which is activated for a predetermined interval when one of said magnetic switches is closed.

5. The educational toy of claim 4 wherein said indicating means also comprises a device which emits a sensible indication when said timing circuit is activated.

6. The educational toy of claim 5 wherein said device comprises a toy which moves and emits sounds when said timing circuit is activated.

7. The educational toy of claim 1 wherein said templates each comprises a rectangular block, said tray is rectangular in shape, and said tray comprises the top of a box, said indicating means being at least partially mounted in said box.

8. The educational toy of claim 7 wherein said indicating means comprises a timing circuit mounted in said box and a device for producing sensible indications mounted externally of said box.

9. The educational toy of claim 8 wherein said timing circuit is arranged to activate said device for a predetermined interval whenever one of said form blocks is inserted into its mating template, and wherein said device is arranged to produce audible and visual indications.

10. An educational toy comprising a box having a flat top which is bounded by an upstanding ledge, a plurality of template blocks which can be positioned on said top in a variety of different positions, each template having a hole therethrough which has a unique plan shape, a corresponding plurality of male form blocks, each having a shape which matches the hole in a respective template, and indicating means for providing a sensible indication when a template is positioned on said tray and a mating form block is inserted into said template.

11. The educational toy of claim 10 wherein said indicating means comprises a timing circuit and means for providing a sensible indication in response to actuation of said timing circuit, said timing circuit being responsive to insertion of any of said form blocks into the hole in its mating template.

12. The educational toy of claim 11 wherein said timing circuit is arranged to provide a timed output of about 10 seconds in response to said insertion of any of said form blocks, said means for providing a sensible indication comprising a device which provides visible and auditory indications.

13. The educational toy of claim 12 wherein said device comprises a toy figure which moves and emits sounds upon activation thereof.

14. The educational toy of claim 13 wherein said template blocks are shorter in height than said form blocks said template blocks and said box being rectangular.

15. The educational toy of claim 14 wherein said form blocks each have a magnet therein and wherein said box has a plurality of magnetic switches positioned therein, said magnetic switches and said magnets constituting part of said indicating means.

16. The educational toy of claim 15 wherein said box contains said timing circuit and an energy source to energize said timing circuit, said toy being connected to said box by an electrical wire.

17. An educational device comprising, in combination:
 a box, said box having a flat top, said top having a plurality of upstanding sides around the edges thereof,
 a plurality of template blocks positioned on said top, said template blocks being rearrangeable in a plurality of locations and orientations on said top, each of said template blocks having a uniquely-shaped through hole,
 a corresponding plurality of form blocks, each form block having a unique shape so that it can be inserted in the hole in one only of said templates,
 a device for providing a sensible indication, and control means for actuating said device when one of said form blocks is inserted into its mating template.

18. The educational toy of claim 17 wherein said control means comprises a corresponding plurality of magnetic switches below said template and a corresponding plurality of magnets positioned in said form blocks.

19. The educational toy of claim 18 wherein said control means comprises a timing circuit which is arranged to actuate said device for a predetermined interval whenever one of said magnetic switches is actuated.

20. The educational toy of claim 19 wherein said device comprises a toy figure which is arranged to move and sound upon actuation thereof.

* * * * *